United States Patent
Nakamura et al.

[11] Patent Number: 5,907,368
[45] Date of Patent: May 25, 1999

[54] INFORMATION PROCESSING APPARATUS HAVING FUNCTION CAPABLE OF DISPLAYING IMAGE BY TELEVISION SIGNAL

[76] Inventors: Satoshi Nakamura, c/o Fujitsu General Limited, 1116, Suenaga, Takatsu-ku, Kawasaki-shi, Kanagawa 213; Kenichi Fujita, c/o Fujitsu Limited, 1-1, Kamikodanaka 4-chome, Nakahara-ku, Kawasaki-shi, Kanagawa 211, both of Japan

[21] Appl. No.: 08/724,756

[22] Filed: Oct. 3, 1996

[30] Foreign Application Priority Data

Feb. 29, 1996 [JP] Japan .................................. 8-042466

[51] Int. Cl.[6] .......................... H04N 9/475; H04N 9/79; H03L 7/00
[52] U.S. Cl. ...................... 348/520; 348/513; 348/536; 348/537; 348/542; 386/34
[58] Field of Search ................................. 348/510, 511, 348/512, 513, 519, 518, 520, 529, 536, 537, 540, 542, 543, 498; 386/34; H04N 9/475, 9/79; H03L 7/00

[56] References Cited

U.S. PATENT DOCUMENTS

| | | | |
|---|---|---|---|
| 4,727,432 | 2/1988 | Hosaka | 348/529 |
| 4,851,910 | 7/1989 | Kawai et al. | 348/536 |
| 5,200,834 | 4/1993 | Iawaibana et al. | 386/34 |
| 5,280,345 | 1/1994 | Uehara et al. | 348/536 |
| 5,400,148 | 3/1995 | Kashida et al. | 348/512 |
| 5,475,440 | 12/1995 | Kobayashi et al. | 348/537 |

*Primary Examiner*—John K. Peng
*Assistant Examiner*—Wesner Sajous

[57] ABSTRACT

Vertical and horizontal sync signals are separated from an NTSC signal inputted from an outside by an external input circuit and a luminance signal (Y) and chrominance signals (B-Y, R-Y) are extracted and converted into RGB data. External RGB data and RGB data formed by a software are processed and the resultant data is supplied to an output converting circuit. The RGB data is converted into analog signals of the luminance signal and chrominance signals of a television signal by using individual system clock signals and outputted. A clock generating circuit generates two kinds of dot clocks which are used for the output converting circuit. The dot clock which is generated from the clock generating circuit and is used for conversion of the luminance signal is phase matched so as to follow a jitter of a horizontal sync signal (H) separated by an external video input circuit.

7 Claims, 11 Drawing Sheets

| CLOCK TIMING | ① | ② | ③ | ④ | ⑤ | ⑥ |
|---|---|---|---|---|---|---|
| SYSTEM CLOCK E6 | H | L | H | L | H | L |
| INVERTED SYSTEM CLOCK E7 | L | H | L | H | L | H |
| HORIZONTAL SYNC SIGNAL E5 | L | H/L | L | L | L | L |
| DOT CLOCK FOR LUMINANCE E8 | L | L | H | H | L | L |

FIG. 8A SYSTEM CLOCK E6

FIG. 8B INVERTED SYSTEM CLOCK E7

FIG. 8C EXTERNAL HORIZONTAL SYNC SIGNAL E5

FIG. 8D DOT CLOCK FOR LUMINANCE E8

FIG. 8E LUMINANCE DATA D4

F I G. 9

| CLOCK TIMING | ① | ② | ③ | ④ | ⑤ | ⑥ |
|---|---|---|---|---|---|---|
| SYSTEM CLOCK E6 | H | L | H | L | H | L |
| INVERTED SYSTEM CLOCK E7 | L | H | L | H | L | H |
| HORIZONTAL SYNC SIGNAL E5 | H/L | L | L | L | L | L |
| DOT CLOCK FOR LUMINANCE E8 | L | L | L | L | L | H |

FIG. 10A SYSTEM CLOCK E6

FIG. 10B INVERTED SYSTEM CLOCK E7

FIG. 10C EXTERNAL HORIZONTAL SYNC SIGNAL E5

FIG. 10D DOT CLOCK FOR LUMINANCE E8

FIG. 10E LUMINANCE DATA D4

FIG. 11

| CLOCK TIMING | ① | ② | ③ | ④ | ⑤ | ⑥ |
|---|---|---|---|---|---|---|
| SYSTEM CLOCK E6 | H | L | H | L | H | L |
| INVERTED SYSTEM CLOCK E7 | L | H | L | H | L | H |
| HORIZONTAL SYNC SIGNAL E5 | L | L | H/L | L | L | L |
| DOT CLOCK FOR LUMINANCE E8 | L | L | H | H | H | L |

INFORMATION PROCESSING APPARATUS HAVING FUNCTION CAPABLE OF DISPLAYING IMAGE BY TELEVISION SIGNAL

BACKGROUND OF THE INVENTION

The invention relates to an information processing apparatus having a function which can display an image by a television signal of the NTSC or the like and, more particularly, to an information processing apparatus for making it possible to output and display a synthetic image in which an influence by a jitter of a television signal inputted from the outside is suppressed to a minimum value.

Owing to a low price of a personal computer and a development of multimedia goods in recent years, from the conventional personal computer using an RGB monitor as a display medium, there is increasing a request for functions such that a television monitor of a large screen and a high widespread ratio is used as a display medium and video images or the like of a TV or a VTR are fetched and superimposed onto the picture plane of the personal computer and the resultant image is displayed. However, when the display function of the television monitor is realized by an analog circuit, a circuit construction is complicated and such a complication is opposite to the realization of low costs of a system, so that it is necessary to digitize a circuit so as to form an LSI.

Figure 1:
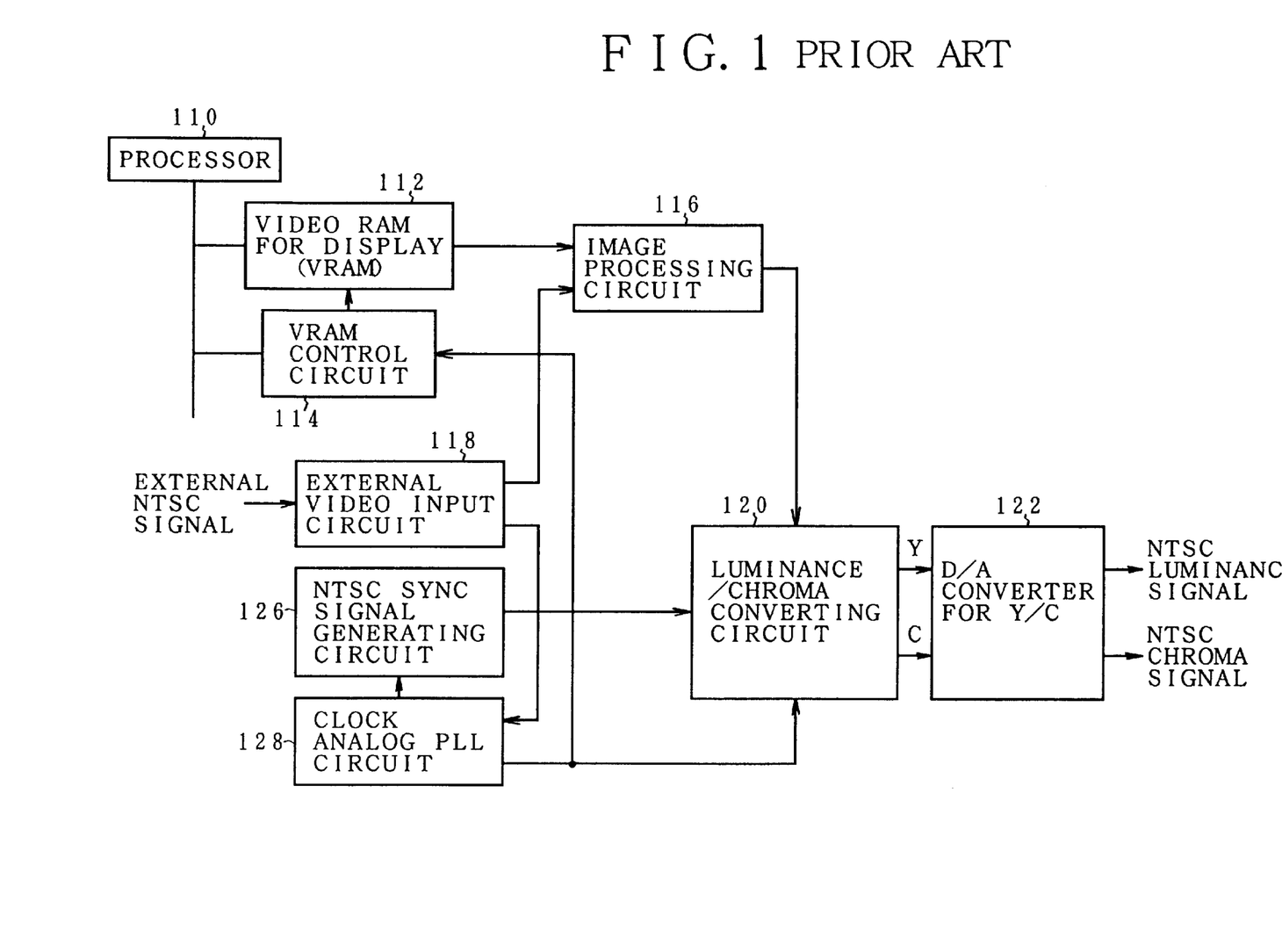
FIG. 1 is a block diagram showing a conventional apparatus.

FIG. 1 shows an example of an information processing apparatus having a conventional television display function. A video RAM (VRAM) 112 for display is provided for a processor 110. RGB data according to a predetermined format has been stored in the VRAM 112 on a frame unit basis under the control of a VRAM control circuit 114. An NTSC signal from the outside such as television tuner, video deck, or the like is inputted to an external video input circuit 118. The external video input circuit 118 separates a vertical sync signal and a horizontal sync signal from the NTSC signal, extracts a luminance signal (Y) and color difference signals (B−Y) and (R−Y), converts the extracted signals to RGB signals, converts the RGB signals into digital RGB data, and generates the resultant data to an image processing circuit 116. The image processing circuit 116 performs a proper image process to superimpose the RGB data of the NTSC signal from the outside onto the RGB data from the VRAM 112 for display or the like and outputs the processed RGB data to a luminance chroma converting circuit 120. By the digital process, the luminance chroma converting circuit 120 converts the RGB data into chroma data (C) in which the luminance signal (Y) and the color difference signals (B−Y) and (R−Y) as chrominance signals of the NTSC system were two-phase orthogonal modulated by a frequency fsc (=3.58 MHz) of a color subcarrier. Further, the vertical and horizontal sync signals generated by an NTSC sync signal generating circuit 126 are added to the luminance data (Y). A burst signal of fsc (=3.58 Mhz) is added to the chroma data. The luminance data (Y) and chroma data (C) from the luminance chroma converting circuit 120 are converted into analog signals by a D/A converting circuit 122 and are respectively outputted as an NTSC luminance signal (Y) and an NTSC chroma signal (C) to a television monitor. In this instance, a dot clock of a frequency of 4 fsc which is four times as large as the subcarrier frequency of fsc is needed for the conversion to the luminance data (Y) in the luminance chroma converting circuit 120. A dot clock of the frequency of 4 fsc of four times is also similarly needed for the conversion to the chroma data (C). It is necessary to synchronize those dot clocks with the NTSC signal from the outside. The horizontal sync signal separated by the external video input circuit 118 is supplied to a clock analog PLL circuit 128, thereby synchronizing the phase of the dot clocks which are used in the NTSC sync signal generating circuit 126 and luminance chroma converting circuit 120 with the phase of the horizontal sync signal from the outside.

However, in such a conventional information processing apparatus having the television display function, the luminance signal of the NTSC signal from the outside ordinarily has a jitter. For a fluctuation of the phase of the horizontal sync signal due to the jitter, the phase synchronization of the system clock is performed by the clock analog PLL circuit 128. In this case, as for the conversion of the luminance signal to the luminance data by using the dot clocks obtained by frequency dividing the system clocks, even when a phase jump to synchronize the phase is performed to the jitter, there is no problem. However, a continuity of the dot clocks which are used for the chroma conversion is lost by the phase jump to perform the phase synchronization for the jitter, so that there is a problem such that an abnormal color is reproduced.

In order to guarantee the continuity of the dot clocks in the chroma conversion, when the dot clocks which are not transmitted through the clock analog PLL circuit 128 are used, there is no problem in the chroma conversion. However, since the dot clocks to be used to convert the luminance signal to the luminance data don't follow the jitter of the external luminance signal, a fluctuation of a scanning line in the horizontal direction occurs, so that a problem such that a reproducing quality deteriorates occurs.

SUMMARY OF THE INVENTION

According to the invention, there is provided an information processing apparatus which can display to a television so as to allow a clock of a luminance conversion to follow a video jitter of an external television signal and to enable a continuity of clocks in a chroma conversion to be guaranteed.

In order to enable a television display, the information processing apparatus of the invention has an external video input circuit, an image processing circuit, an output converting circuit, and a clock generating circuit. The external video input circuit separates vertical and horizontal sync signals from a television signal of a predetermined signal format inputted from the outside, extracts a luminance signal and chrominance signals from the television signal, and converts into image data of a predetermined format, for example, RGB data. The image processing circuit performs image processes such as switching, synthesis, superimposition, and the like of internal image data formed in the circuit by a program software of a processor and external image data converted from the television signal inputted from the outside, and outputs the processed image data. The output converting circuit converts the image data from the image processing circuit into a luminance signal and chrominance signals of the television signal by using individual dot clock signals and outputs them synchronously with the vertical and horizontal sync signals separated by the external video input circuit. The clock generating circuit individually generates a dot clock for the luminance signal and a dot clock for the chrominance signals by frequency dividing the system clock of a predetermined frequency. With respect to the dot clock for the luminance signal, it is synchronized with the phase of the horizontal sync signal separated by the external video input circuit and is outputted.

The output converting circuit comprises: a converting circuit for converting the RGB data into luminance data and color difference data; a sync signal adding circuit for adding the vertical and horizontal sync signals synchronized with the television signal from the outside to the luminance data; a reference phase adding circuit for adding a color reference phase signal of the television signal to the color difference data; a first D/A converting circuit for converting the luminance data into an analog signal; and a second D/A converting circuit for converting the color difference data to an analog signal.

The clock generating circuit comprises an oscillator for generating a system clock of a predetermined frequency, a selection frequency dividing circuit, and a frequency dividing circuit. The selection frequency dividing circuit receives the system clock of the oscillator and its inverted clock. When the horizontal sync signal lies within a specific phase timing range having a predetermined width, the selection frequency dividing circuit selects the system clock and outputs its frequency dividing clock. When the horizontal sync signal is deviated out of the specific phase timing range by a phase jitter and is shifted to an adjacent clock range of a predetermined width before and after the specific phase timing range, the selection frequency dividing circuit selects the inverted system clock, outputs its frequency dividing clock, and supplies the frequency dividing clock as a dot clock to the sync signal adding circuit and the first D/A converting circuit. Further specifically speaking, when the horizontal sync signal E5 lies within the specific phase timing range of a ½ clock width, the selection frequency dividing circuit selects the system clock and outputs its frequency dividing clock. When the horizontal sync signal is deviated out of the specific phase timing range by a jitter and is shifted to an adjacent clock range of a ½ clock width before and after such a specific phase timing range, the selection frequency dividing circuit selects the inverted system clock and outputs its frequency dividing clock. The frequency dividing circuit frequency divides the system clock of the clock oscillator as it is and supplies the frequency dividing clock as a dot clock to the reference phase adding circuit and the second D/A converting circuit. The external video input circuit comprises: a sync separating circuit for extracting the horizontal and vertical sync signals from the television signal inputted from the outside; an RGB converting circuit for separating a luminance signal and chrominance signals from the television signal and, after that, converting to RGB signals; and an A/D converting circuit for digitally converting the RGB signals to RGB data of a predetermined format.

When the television signal is an NTSC signal, each circuit section is constructed as follows. First, the external video input circuit comprises: a sync separating circuit for extracting vertical and horizontal sync signals from the NTSC signal inputted from the outside; an RGB converting circuit for extracting a luminance signal (Y) and color difference signals (B–Y) and (R–Y) from the NTSC signal and, after that, converting to RGB signals; and an A/D converting circuit for digitally converting the RGB signals to RGB data of a predetermined format. The output converting circuit comprises: an RGB matrix circuit for converting the RGB data into luminance data (Y) and color difference data (B–Y) and (R–Y); a low pass filter for eliminating a high band component by digitally sampling the color difference data (B–Y) and (R–Y); a level converting circuit for adjusting levels of the luminance data (Y) and color difference data (B–Y) and (R–Y) in order to match with a standard level of the NTSC signal; a timing generator for generating timing signals for adding the synchronized vertical and horizontal sync signals and a burst signal of a color phase reference to the NTSC signal inputted from the outside; a sync adding circuit for adding the vertical and horizontal sync signals to the luminance data (Y); a burst adding circuit for adding the burst signal to the color difference data (B–Y) and (R–Y); a modulator for performing a two-phase orthogonal modulation to the color difference data (B–Y) and (R–Y), thereby modulating to chroma data (C); a first D/A converting circuit for converting the luminance data into an analog luminance signal; and a second D/A converting circuit for converting the chroma data (C) into an analog chroma signal.

Further, the clock generating circuit comprises: an oscillator for generating a system clock of a frequency which is eight times as high as the frequency fsc of a color reference subcarrier; a selection frequency dividing circuit for receiving the system clock of the oscillator and its inverted clock, for selecting the system clock and outputting a clock of 4 fsc which was frequency divided into ½ when the horizontal sync signal lies within a specific phase timing range having a predetermined width, for selecting the inverted system clock E7 and outputting a clock of 4 fsc which was frequency divided into ½ when the horizontal sync signal E5 is deviated out of the specific phase timing range by a phase jitter and is shifted to an adjacent clock range of a predetermined width before and after such a specific phase timing range, and for supplying the frequency dividing clock as a dot clock to the sync signal adding circuit and the first D/A converting circuit; and a frequency dividing circuit for frequency dividing the system clock of the clock oscillator to 4 fsc of ½ and for supplying the frequency dividing clock as a dot clock to the reference phase adding circuit and the second D/A converting circuit. The modulator which is used in the output converting circuit of the NTSC signal converts the color difference signals (B–Y) and (R–Y) into the chroma data (C) in which they were two-phase orthogonal modulated by a selecting circuit by using a dot clock E9 of the frequency 4 fsc. Further, the invention can be also applied to an apparatus having a signal format of a PAL signal, an SECAM signal, or an extended definition television signal (EDTV signal) in addition to the NTSC signal.

According to the invention as mentioned above, the luminance conversion is processed by the clock whose phase was synchronized with that of the external horizontal sync signal and, the clock of, for example, the frequency 8 fsc which is eight times as high as the color reference subcarrier frequency is individually generated from the external horizontal sync signal and the chroma conversion is executed on the basis of such a clock of 8 fsc, thereby keeping the phase relation between the chroma data after the conversion and the subcarrier frequency fsc. Therefore, even when the converting process of the television signal having a jitter, for example, the NTSC signal is digitized, the luminance conversion and the chroma conversion are processed by different system clocks, in the luminance conversion, the system clock is phase synchronized with that of the external horizontal sync signal, and in the chroma conversion, the phase relation with the NTSC burst signal is held, so that the proper NTSC conversion can be performed. Since it is unnecessary to use a PLL circuit, a circuit construction is simplified and the LSI can be easily formed.

The above and other objects, features, and advantages of the present invention will become more apparent from the following detailed description with reference to the drawings.

DETAILED DESCRIPTION OF THE PREFERRED EMBODIMENT

Figure 2:
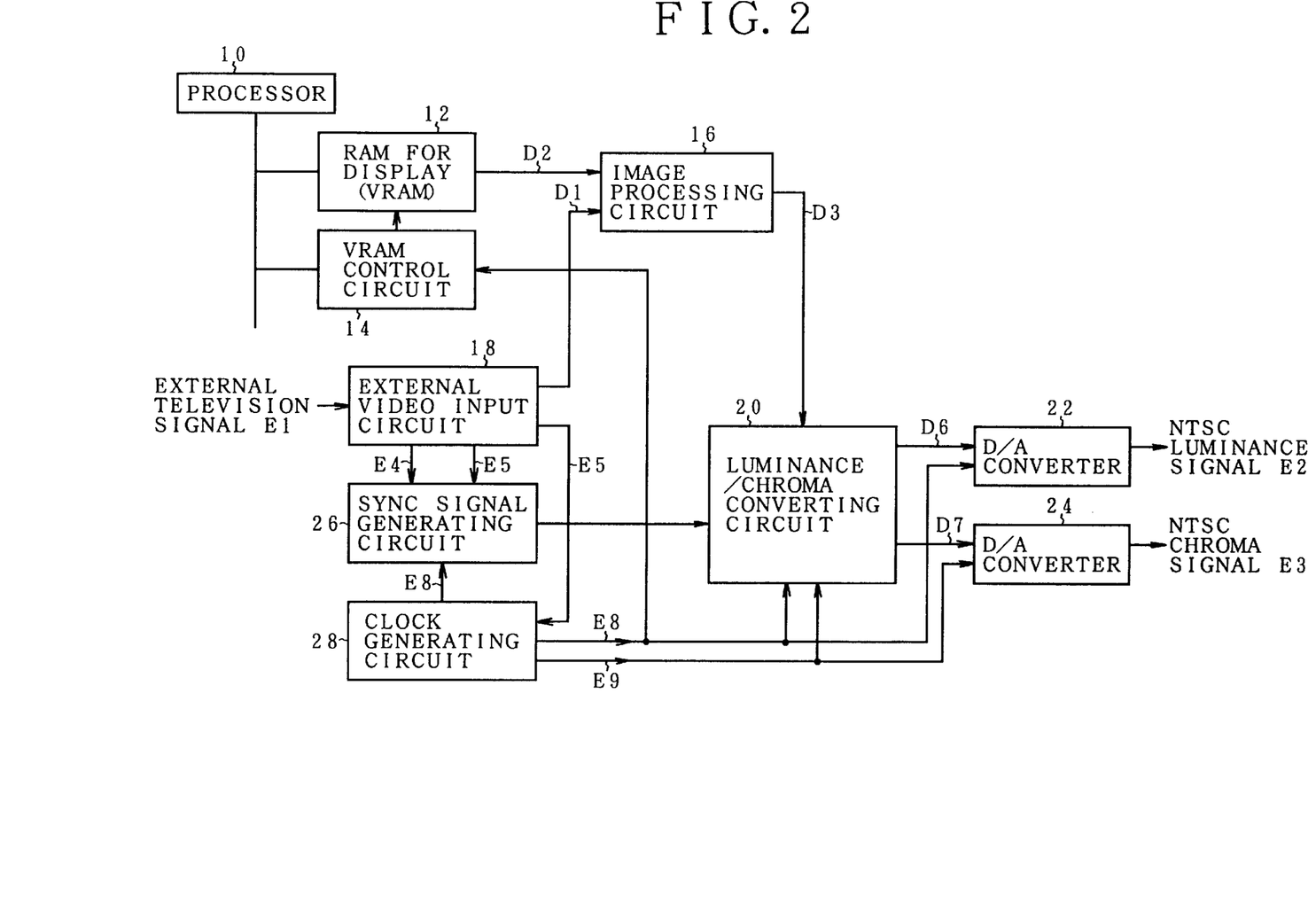
FIG. 2 is a block diagram of a fundamental construction of the invention.

FIG. 2 is a block diagram of a fundamental construction of an information processing apparatus having a television display function of the invention. An RAM 12 for display known as a VRAM and a VRAM control circuit 14 are provided for a processor 10. The processor 10 writes or reads out image data to/from the RAM 12 for display by an execution of an application program for image display. The VRAM control circuit 14 generates a write address and a read address to the RAM 12 for display and switches between a write control and a read control. Image data to be stored in the RAM 12 for display is RGB data having a predetermined format. An external video input circuit 18 for inputting a television signal from the outside is provided for such processing units of the image data on the processor 10 side. An external television signal E1 is inputted from a television tuner, a video deck, or the like to the external video input circuit 18. The external video input circuit 18 extracts a vertical sync signal E4 and a horizontal sync signal E5 from the external television signal E1, converts a luminance signal and chrominance signals which are obtained as analog signals into RGB signals, after that, converts into digital data, and generates the resultant data as RGB data D1. An image processing circuit 16 executes image processes such as switching of images, synthesis of images, superimposition of images, and the like by using the RGB data from the RAM 12 for display which is read out by a program control of the processor 10 and the RGB data D1 obtained from the external television signal E1 which is outputted from the external video input circuit 18, thereby outputting processed RGB data D3. A luminance/chroma converting circuit 20 functions as an output converting circuit for again converting the format of the RGB data to the format of the original television signal. In this instance, the luminance/chroma converting circuit 20 uses the NTSC system as an example. According to the NTSC system, the television signal is a composite signal of the luminance signal (Y) and color difference signals (B–Y) and (R–Y). Further, the color difference signals (B–Y) and (R–Y) are finally mixed into the luminance signal as a chroma signal (C) which was two-phase orthogonal modulated by the color reference subcarrier of fsc (=3.5 MHz) known as a burst signal. The luminance/chroma converting circuit 20, therefore, converts the RGB data D3 from the image processing circuit 16 into the luminance signal (Y) and chroma signal (C) according to, for example, the NTSC signal format by the digital processes and generates luminance data D6 and chroma data D7. The luminance data D6 is finally converted to an analog signal by a D/A converter 22 and is outputted as an NTSC luminance signal E2. At the same time, the chroma data D7 is converted to an analog signal by a D/A converter 24 and is generated as an NTSC chroma signal E3. For the conversion from the RGB data to the luminance data and chroma data in the luminance/chroma converting circuit 20, it is necessary to add the vertical and horizontal sync signals to the luminance data and to add the burst signal to the color difference data (B–Y) and (R–Y). The horizontal and vertical sync signals are supplied from a sync signal generating circuit 26 to the luminance/chroma converting circuit 20. The vertical sync signal E4 and horizontal sync signal E5 separated from the external television signal E1 extracted by the external video input circuit 18 are inputted to the sync signal generating circuit 26. These vertical and horizontal sync signals having timings synchronized with the external television signal E1 are added to the luminance data by the luminance/chroma converting circuit 20. Further, a dot clock for chromaticity of 4 fsc (=14.32 MHz) is needed for the conversion of the luminance data in the luminance/chroma converting circuit 20. A dot clock for luminance of 4 fsc (=14.32 MHz) is also similarly needed for the conversion to the luminance data. Such dot clock for chromaticity and dot clock for luminance of 4 fsc are formed by a clock generating circuit 28. The clock generating circuit 28 generates a dot clock E9 for chromaticity and a dot clock E8 for luminance of 4 fsc by frequency dividing the system clock of 8 fsc (=28.64 MHz) into ½ by different frequency dividing circuits. The dot clock E9 for chromaticity is supplied as a continuous clock without synchronizing with that of the horizontal sync signal E5 obtained by the external video input circuit 18. On the contrary, as for the dot clock E8 for luminance, the phase matching by the horizontal sync signal E5 of the external television signal E1 separated by the external video input circuit 18 is performed, thereby performing the phase synchronization to obtain the dot clock for luminance having a minimum phase error for the horizontal sync signal from the outside.

Figure 3:
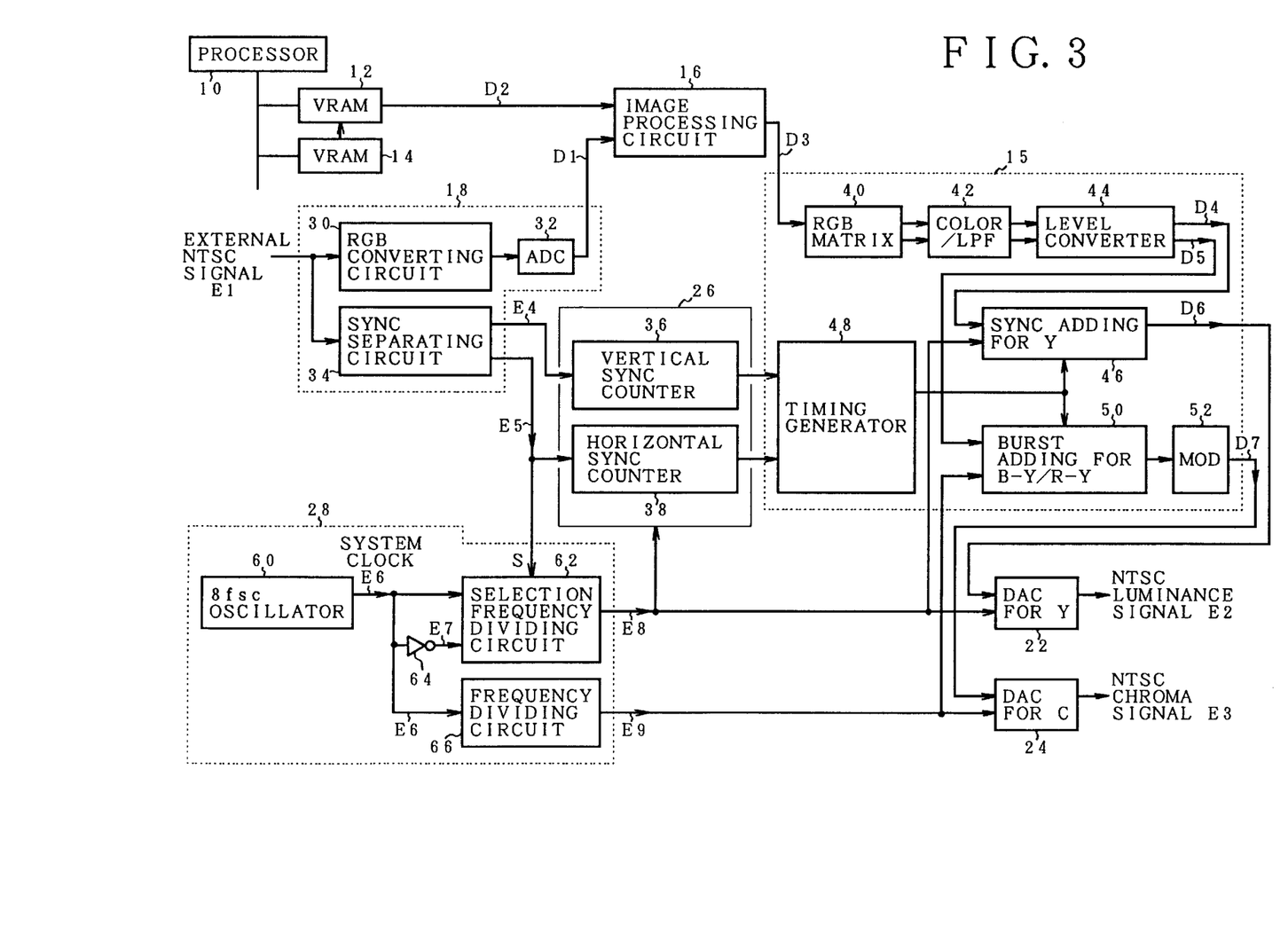
FIG. 3 is a block diagram of an embodiment when the invention is applied to an NTSC signal.

FIG. 3 is a specific circuit construction of each circuit section when the NTSC signal is used as a television signal with respect to the fundamental embodiment in FIG. 2. The external video input circuit 18 is first constructed by an RGB converting circuit 30, an A/D converter 32, and a sync separating circuit 34. The RGB converting circuit 30 separates the luminance signal (Y) and chroma signal (C) from the NTSC signal E1 from the outside, further demodulates the color difference signals (B–Y) and (R–Y) with respect to the chroma signal (C) by demodulation, and inputs those signals to an RGB matrix circuit, thereby converting to RGB data. The RGB data D1 based on the external NTSC signal E1 obtained by the RGB converting circuit 30 is converted to a digital signal of the same data format as that of the RGB data which is a target of a display control of the processor 10 and has been stored in the VRAM 12, namely, the RAM for display. The digital signal is outputted as RGB data D1 to the image processing circuit 16. The sync separating circuit 34 separates the vertical sync signal E4 and horizontal sync signal E5 included in the external NTSC signal E1 and supplied to the sync signal generating circuit 26. The horizontal sync signal E5 is supplied to the clock generating circuit 28, thereby obtaining a phase synchronization with the dot clock E8 for luminance. The image processing circuit 16 receives RGB data D2 read out from the VRAM 12 and the RGB data D1 obtained from the external video input circuit 18 and executes image processes such as switching of images, synthesis of images, superimposition of images, and the like on a dot unit basis and is realized by a logical arithmetic operating circuit such as adder, multiplier, selector, flip-flop, or the like for executing an image processing operation. A luminance/chroma converting circuit 15 comprises: an RGB matrix circuit 40; a digital low pass filter 42; a level converter 44; a sync adding circuit 46; a burst adding circuit 50; a modulator 52; and a timing generator 48. The RGB matrix circuit 40 converts the RGB data D3 supplied from the image processing circuit 16 into the luminance data (Y) and color difference data (B−Y) and (R−Y). The digital low pass filter 42 eliminates a high band component by digitally sampling the color difference data obtained by the RGB matrix circuit 40. The level converter 44 performs arithmetic operating processes of output levels for adjusting each of the luminance data and the color difference data to the standard level of the NTSC signal. Luminance data D4 outputted from the level converter 44 is supplied to the sync adding circuit 46. Position timings of the vertical and horizontal sync signals on the time base are supplied to the sync adding circuit 46 from the timing generator 48. The timings of the sync positions are decided on the basis of counting results of a vertical sync counter 36 and a horizontal sync counter 38 which are provided for the sync signal generating circuit 26. Therefore, the position timing of each of the sync signals by the timing generator 48 is synchronized with that of the external NTSC signal E1. The adding timing of the horizontal sync signal in the sync adding circuit 46 corresponds to that of the dot clock E8 for luminance which is generated from the clock generating circuit 28. Consequently, the timing phase of the horizontal sync signal from the timing generator 48 and the timing phase of the dot clock E8 for luminance from the clock generating circuit 28 have to be synchronized. Color difference data D5 from the level converter 44 is supplied to the burst adding circuit 50 and a burst signal of fsc (=3.58 MHz) is added to a portion of a back porch of the luminance signal. In order to add the burst signal to the color difference signals, the dot clock E9 for chromaticity of 4 fsc is supplied from the clock generating circuit 28. The color difference data (B−Y) and (R−Y) to which the burst signal was added by the burst adding circuit 50 are supplied to the modulator 52 and are subjected to the digital modulating process corresponding to the two-phase orthogonal modulation is performed by using the color reference subcarrier of fsc (=3.58 MHz), so that they are converted to the chroma data D7 and outputted. As a modulator 52, by using the dot clock E9 for chromaticity of 4 fsc (=14.318 MHz), a circuit for realizing the modulation of the color difference signals to the chroma signal by only a selector without having any arithmetic operation table can be used, wherein a burst adding circuit 50 and a modulator 52 form a reference phase adding circuit 51. The luminance data D6 and chroma data D7 obtained by the luminance/chroma converting circuit 20 are converted to analog signals by the exclusive-use D/A converters 22 and 24, respectively, are outputted as NTSC luminance signal E2 and NTSC chroma signal E3, and are supplied to a television monitor, so that a processed image by the image processing circuit 16 is displayed.

The clock generating circuit 28 has an oscillator 60 for generating a system clock of 8 fsc (=28.64 MHz). A system clock E6 from the oscillator 60 is supplied to a frequency dividing circuit 66 and is converted to the dot clock E9 for chromaticity of 4 fsc (=14.32 MHz) by frequency dividing into ½ and is supplied to the burst adding circuit 50 of the luminance/chroma converting circuit 15 and D/A converter 24 for chromaticity. The phase of the dot clock E9 for chromaticity which is generated from the frequency dividing circuit 66 is not synchronized with that of the horizontal sync signal E5 of the external NTSC signal E1 which is obtained from the external video input circuit 18. Even if a jitter occurs in the external NTSC signal E1 and a phase deviation occurs, successive dot clocks are generated irrespective of such a deviation.

Figure 4A:
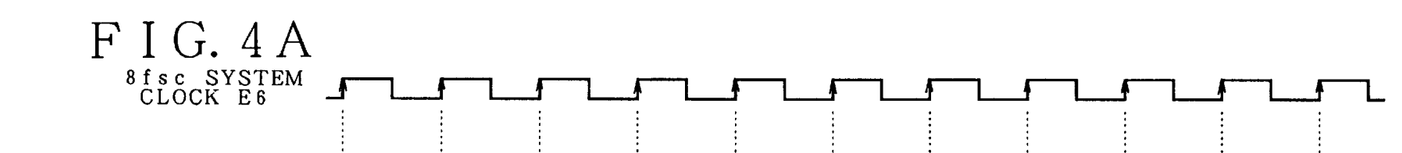
FIGS. 4A to 4D are timing charts for generation of dot clocks for a color difference by a frequency dividing circuit in FIG. 3.
Figure 4B:
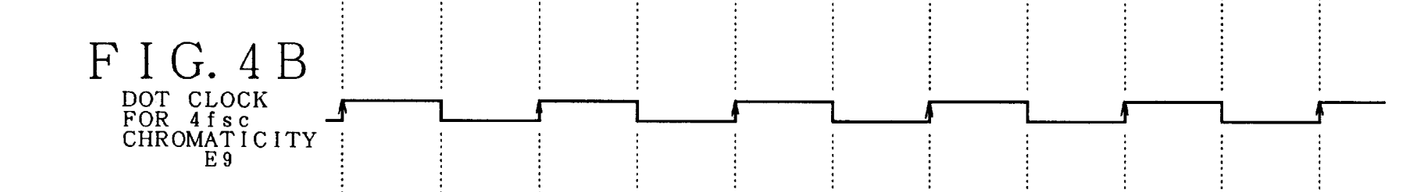
Figures 4C, 4D:
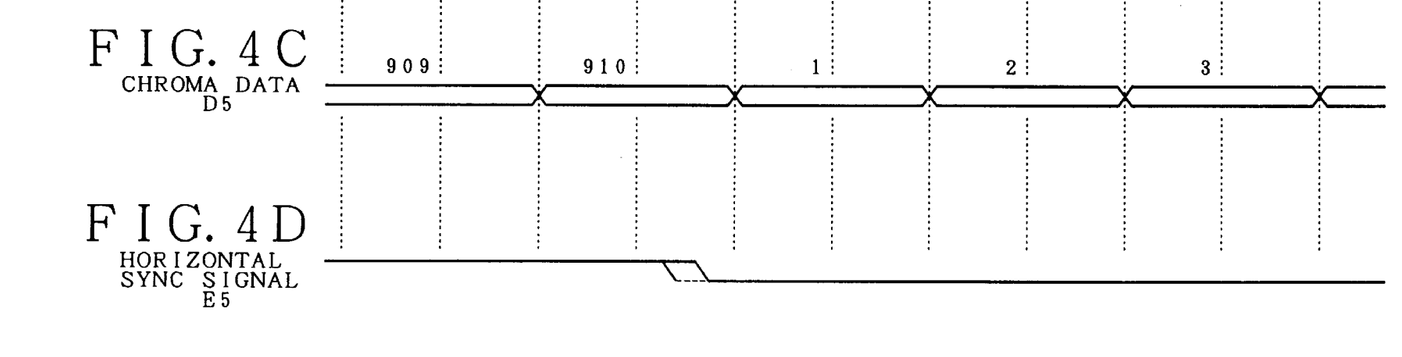

In FIGS. 4A to 4D, the dot clock E9 for chromaticity which is generated by the frequency dividing circuit 66 of the clock generating circuit 28 is shown together with the system clock E6, chroma data D5, and horizontal sync signal E5. By frequency dividing the system clock E6 of 8 fsc in FIG. 4A into ½, the dot clock E9 for chromaticity of 4 fsc in FIG. 4B can be obtained. For the dot clock E9 for chromaticity, the chroma data D5 of FIG. 4C is shown by dot numbers 1 to 910 each indicative of the number of dots in one horizontal scan period and is data which is successively repeated every period of the horizontal sync signal E5. In this instance, even if a jitter as shown by a broken line in the horizontal sync signal E5 occurs, since the synchronization with the horizontal sync signal E5 is not considered, the continuity of the dot clock E9 for chromaticity is not lost.

When referring again to FIG. 3, a selection frequency dividing circuit 62 is provided for the clock generating circuit 28 in order to generate the dot clock E8 for luminance. The system clocks E6 of 8 fsc (=28.64 MHz) from the oscillator 60 and an inverted system clock E7 obtained by inverting the system clocks E6 by an inverter 64 are inputted to the selection frequency dividing circuit 62. The selection frequency dividing circuit 62 selects either one of the system clock E6 and the inverted system clock E7 and generates the dot clock E8 for luminance which was frequency divided into ½. The selection of the system clock E6 and inverted system clock E7 in the selection frequency dividing circuit 62 is performed on the basis of the horizontal sync signal E5 which is supplied from the external video input circuit 18. Namely, when there is no jitter in the horizontal sync signal separated from the external NTSC signal E1, the selection frequency dividing circuit 62 selects the system clock E6 and generates the dot clock E8 for luminance which was frequency divided into ½. On the other hand, when a jitter occurs in the horizontal sync signal E5, the selection frequency dividing circuit 62 selects the inverted system clock E7 and generates the dot clock E8 for luminance obtained by frequency dividing the inverted system clock E7 into ½. Thus, the dot clock E8 for luminance in which the phase deviation due to the jitter of the horizontal sync signal E5 is minimized can be generated.

Figure 5:
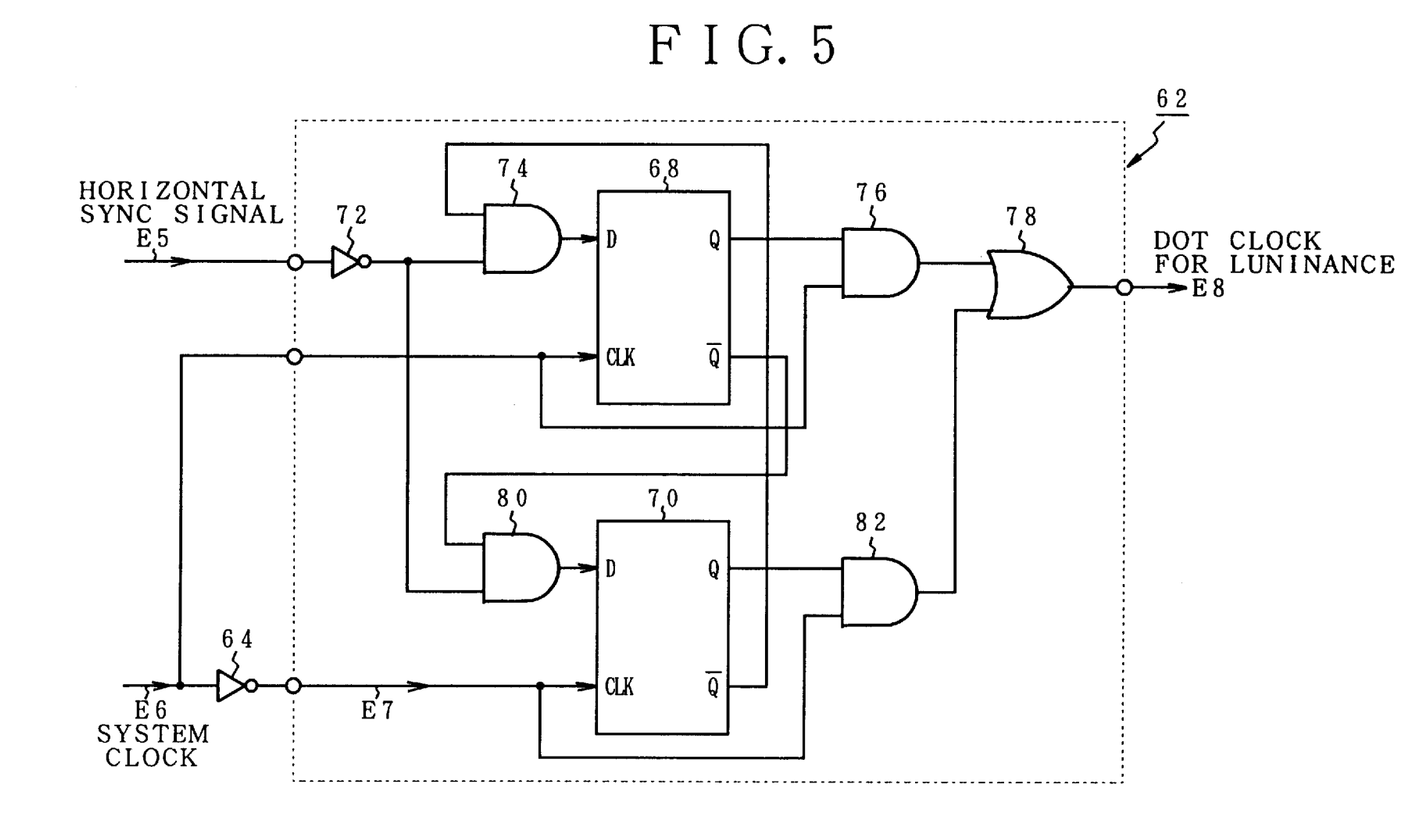
FIG. 5 is a circuit block diagram of a phase sync frequency dividing circuit in FIG. 3.

FIG. 5 is a specific circuit construction of the selection frequency dividing circuit 62 in FIG. 3. The selection frequency dividing circuit 62 has D-FFs 68 and 70. The system clock E6 is inputted to a clock terminal CLK of the D-FF 68. The inverted system clock E7 which was inverted by the inverter 64 is inputted to a clock terminal CLK of the D-FF 70. After the horizontal sync signal E5 was inverted by an inverter 72, it is inputted to D terminals of the D-FFs 68 and 70 through AND circuits 74 and 80, respectively. An inverted output $\overline{Q}$ of the D-FF 70 is fed back and connected to the other input of the AND circuit 74 on the D-FF 68 side. An inverted output $\overline{Q}$ of the D-FF 68 is fed back and connected to the other input of the AND circuit 80 on the D-FF 70 side. The AND of a Q output of the D-FF 68 and the system clock E6 is calculated by an AND circuit 76 and is outputted as a dot clock E8 for luminance through an OR circuit 78. The AND of a Q output of the D-FF 70 and the inverted system clock E7 by the inverter 64 is calculated by an AND circuit 82 and is outputted as a dot clock E8 for luminance from the OR circuit 78.

Figure 6A:
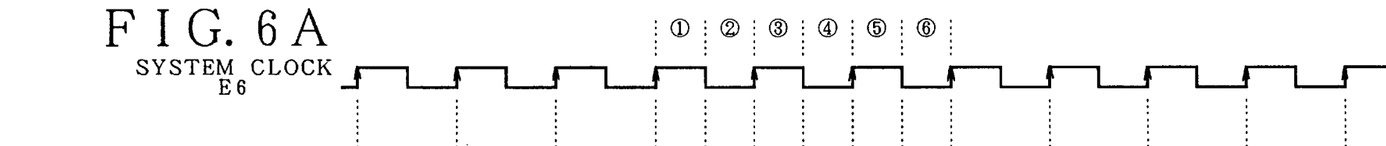
FIGS. 6A to 6E are timing charts of a clock for luminance when a horizontal sync signal has no jitter.
Figure 6B:
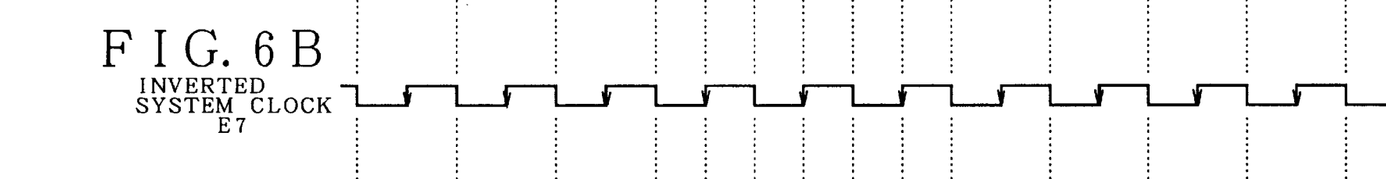
Figure 6C:
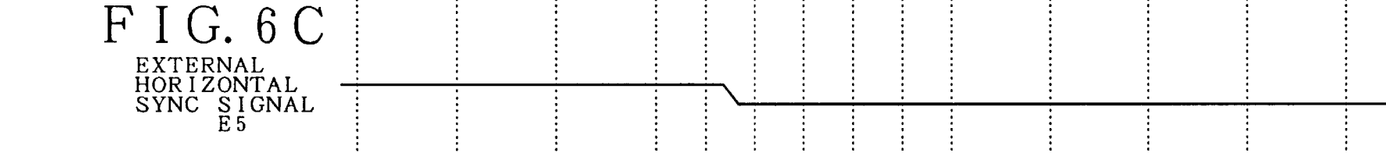
Figure 6D:
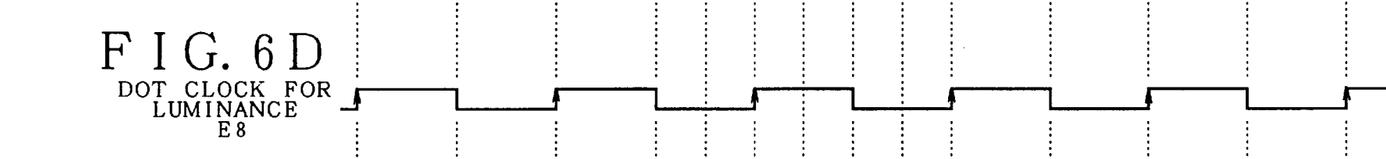
Figure 6E:
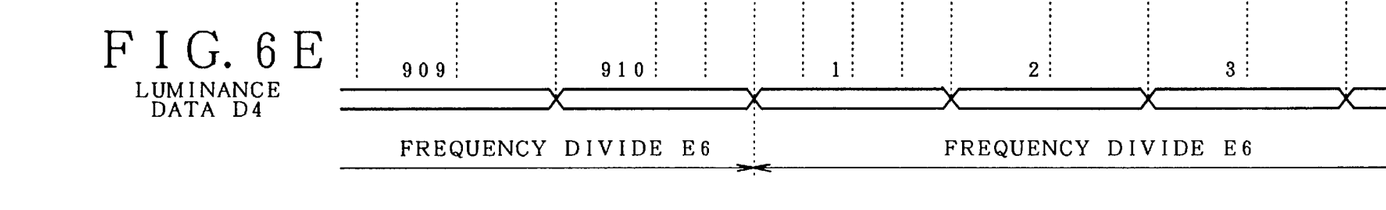

FIGS. 6A to 6E show the output of the dot clock E8 for luminance when there is no jitter in the horizontal sync signal E5 in the selection frequency dividing circuit 62 in FIG. 5 together with the system clock E6, inverted system clock E7, horizontal sync signal E5, and luminance data D4. Since the number of dots in one horizontal scan period is set to 910, the luminance data D4 in FIG. 6E is expressed by adding data numbers 1 to 910. In this case, the horizontal sync signal E5 in FIG. 6C doesn't have a phase jitter. The horizontal sync signal E5 is inverted from the H level to the L level at a timing <2> of the latter half cycle of one cycle of the system clock E6 in FIG. 6A corresponding to the last of the dot No. 910 of the luminance data D4 and indicates the end and start of one horizontal scan period. As mentioned above, when there is no jitter in the horizontal sync signal E5, the selection frequency dividing circuit 62 in FIG. 5 selects the system clock E6 in FIG. 6A and generates the dot clock E8 for luminance in FIG. 6D obtained by frequency dividing into ½.

Figure 7:
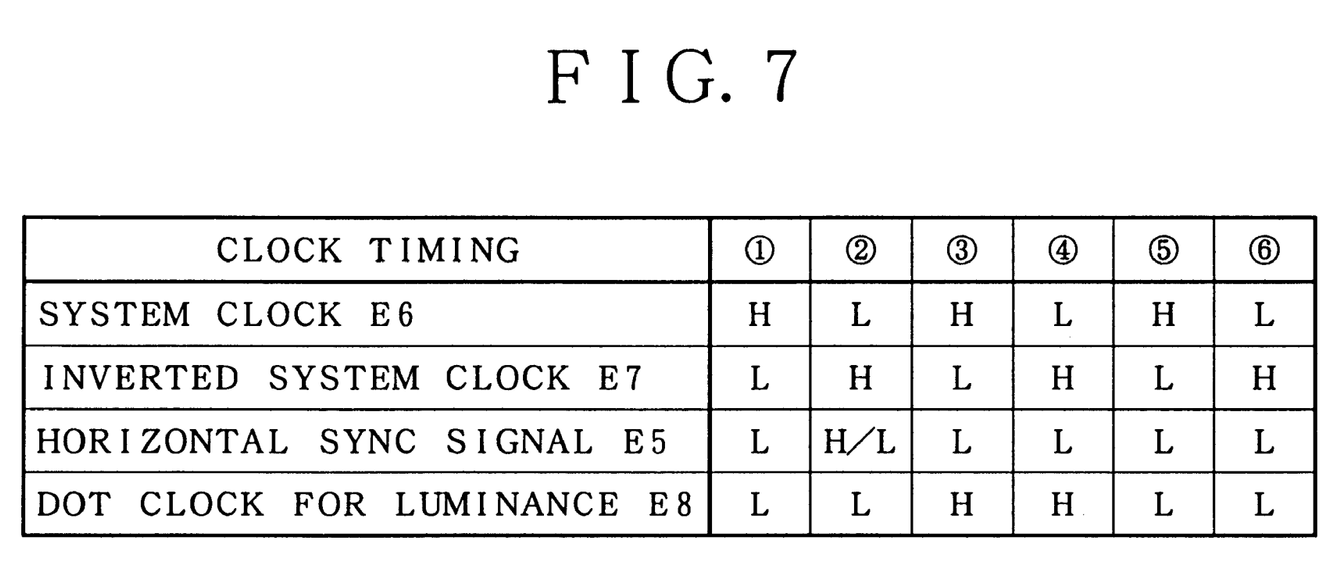
FIG. 7 is an explanatory diagram of signal states of clock timings of FIGS. 6A to 6E.

FIG. 7 shows signal states at clock timings <1> to <6> before and after the end timing of one horizontal scan period during which the horizontal sync signal E5 is inverted from the H level to the L level with respect to FIGS. 6A to 6D, respectively. Namely, when the horizontal sync signal E5 has been inverted from the H level to the L level at the correct clock timing <2>, the frequency dividing operation by the selection of the system clock E6 is repeated.

Figure 8A:
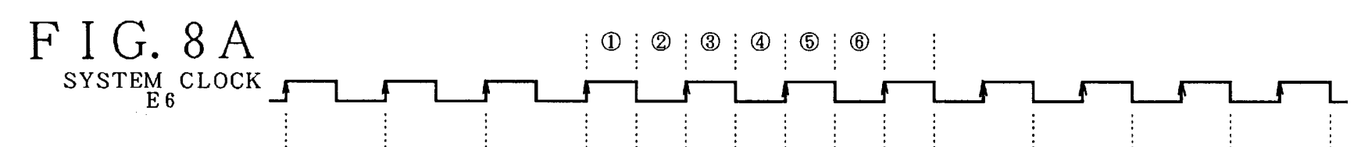
FIGS. 8A to 8E are timing charts of the clock for luminance when a jitter of a phase delay occurs in the horizontal sync signal.
Figure 8B:
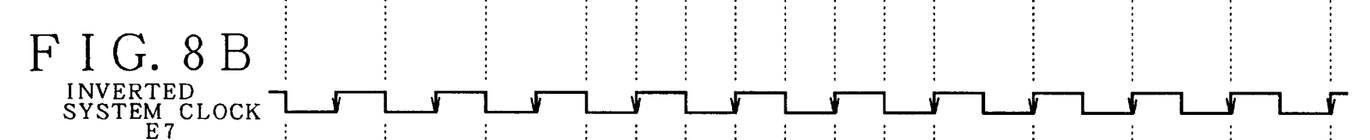
Figure 8C:
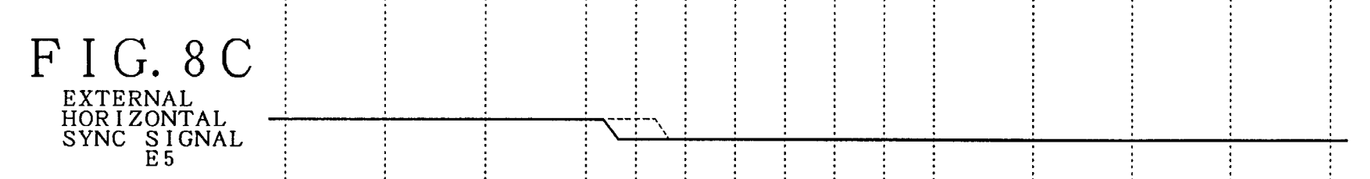
Figure 8D:
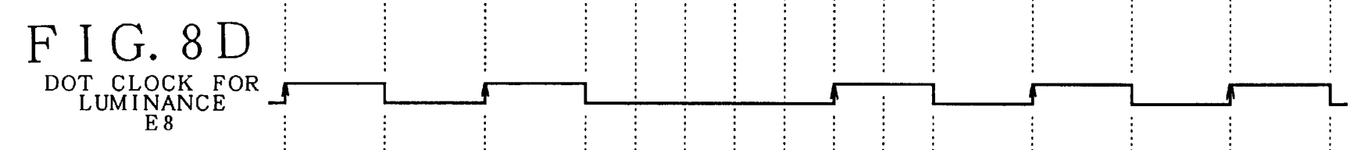
Figure 8E:
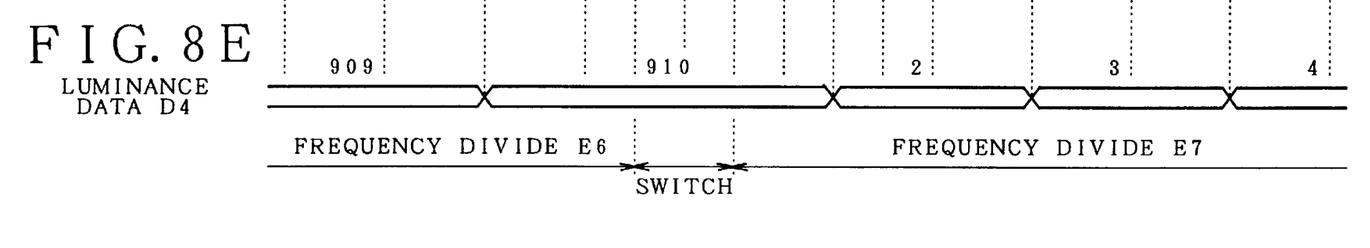
Figure 9:
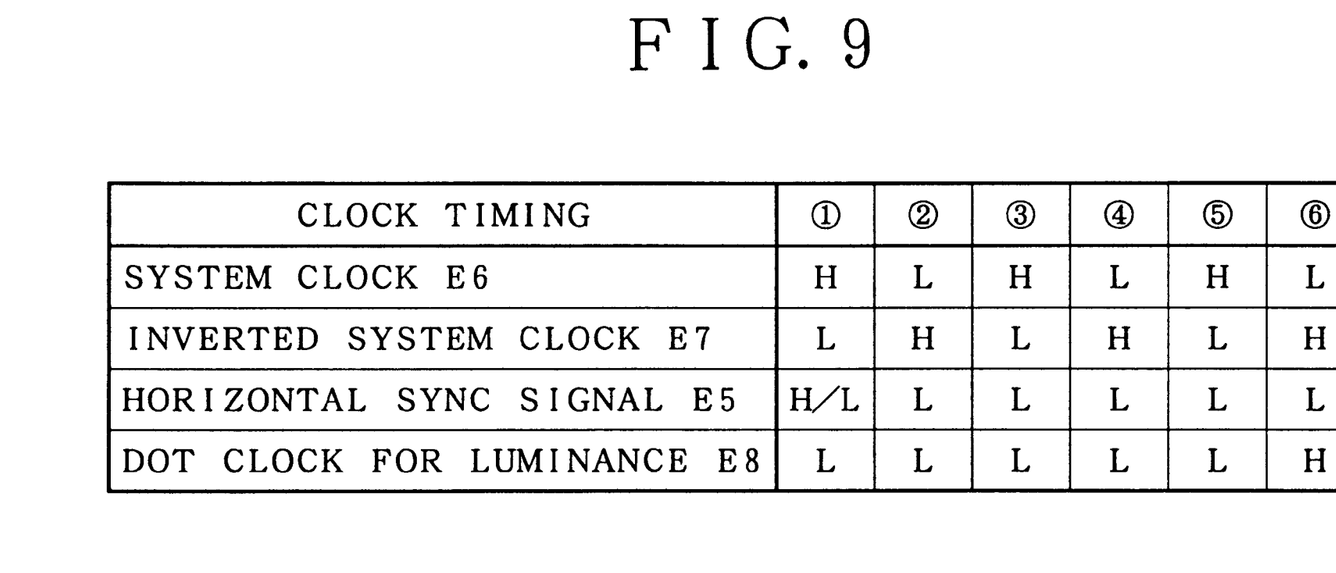
FIG. 9 is an explanatory diagram of signal states of the clock timings of FIGS. 8A to 8E.

FIGS. 8A to 8E are timing charts when a jitter occurs in the horizontal sync signal E5 and the timing at which the horizontal sync signal E5 is inverted from the H level to the L level is shifted from the clock timing <2> to the one-preceding clock timing <1> as shown in FIG. 8C. In this case, the frequency dividing mode is switched from the frequency division by the selection of the system clock E6 so far to the frequency division by the selection of the inverted system clock E7 through the clock timings <2> and <3>. FIG. 9 shows signal states in FIGS. 8A to 8D at the clock timings <1> to <5> in the switching timing by the phase jitter. Namely, when the inversion timing of the horizontal sync signal E5 from the H level to the L level is shifted to the clock timing <1> by the jitter, the signal state L of the dot clock E8 for luminance at that time is continued for a period of time of the clock timings <2> and <3> for switching and is switched to the frequency dividing clock by the selection of the inverted system clock E7 at the next clock timing <4>. In this case, the horizontal sync period is reduced by the jitter due to the phase advance of the horizontal sync signal E5 by a time corresponding to it. Therefore, the luminance data of the first dot No. 1 in the next horizontal scan period of the luminance data in FIG. 8E is lost and the luminance data is processed from the next dot No. 2.

Figure 10A:
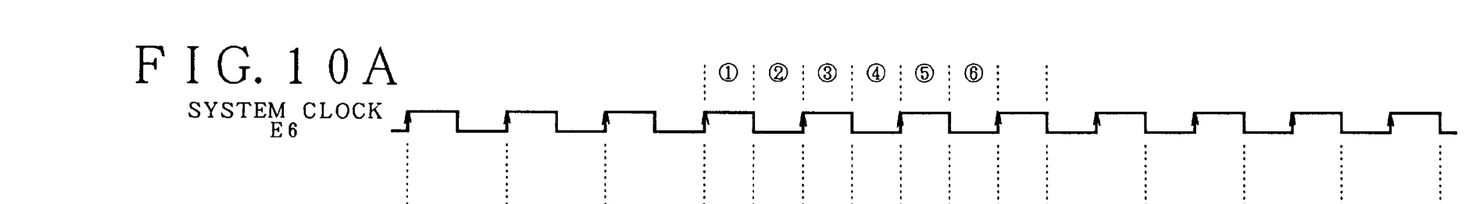
FIGS. 10A to 10E are timing charts of the clock for luminance when a jitter of a phase advance occurs in the horizontal sync signal.
Figure 10B:
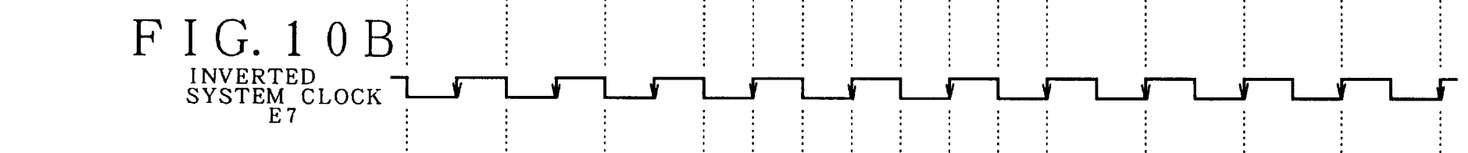
Figure 10C:
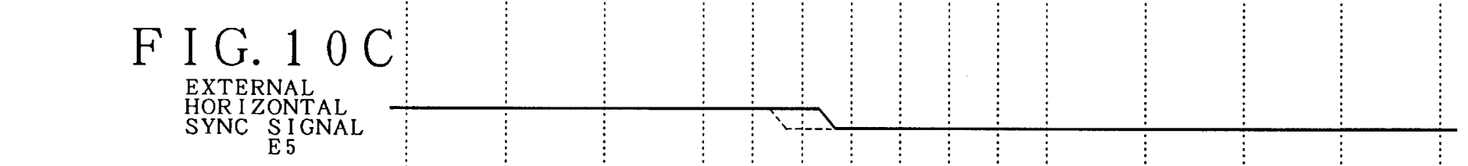
Figure 10D:
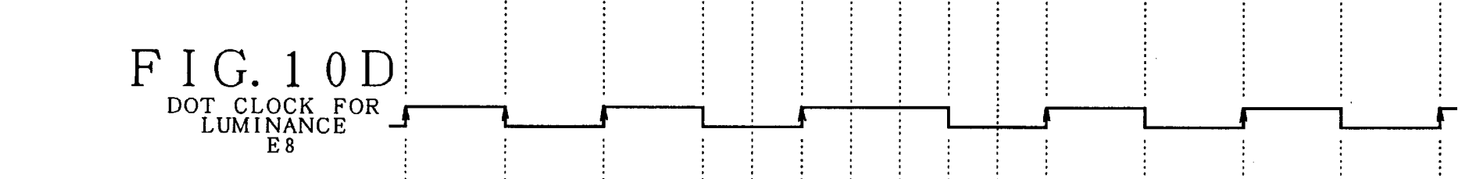
Figure 10E:
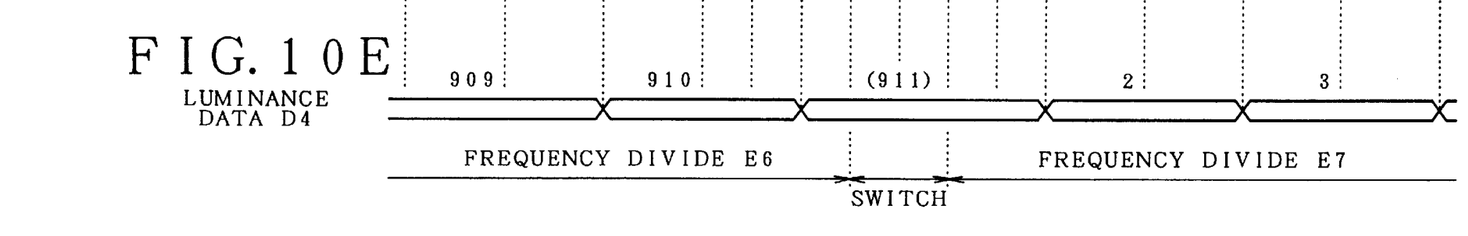
Figure 11:
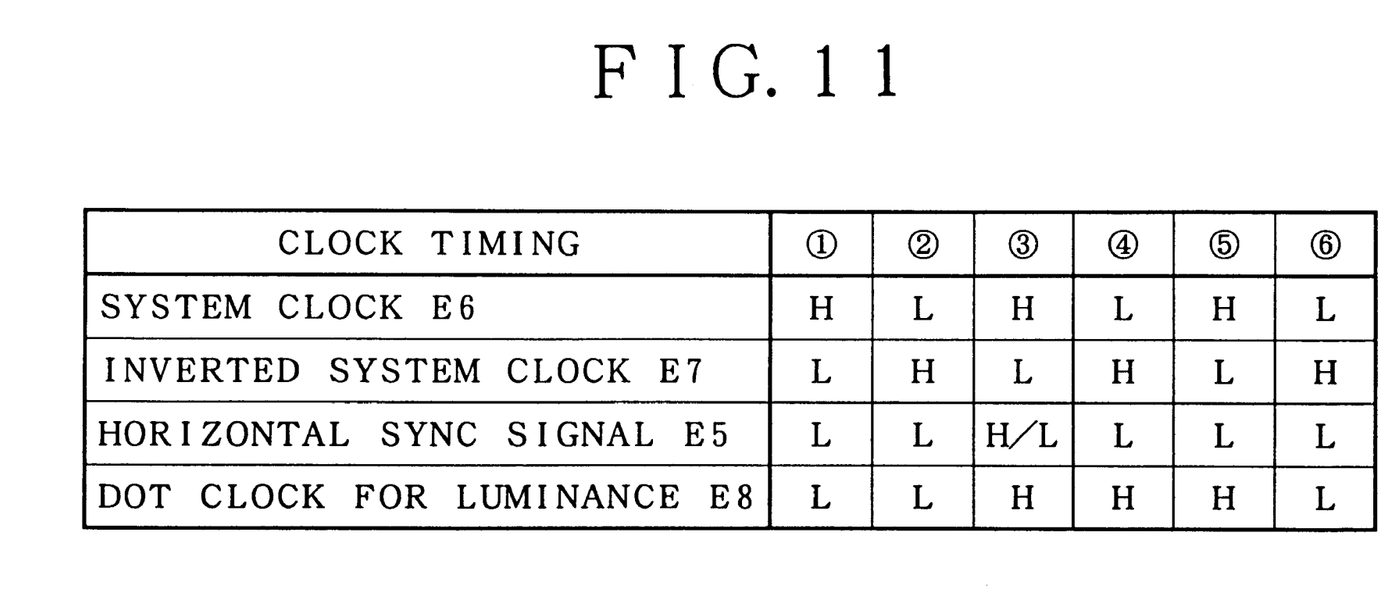
FIG. 11 is an explanatory diagram of signal states of the clock timings of FIGS. 10A to 10E.

FIGS. 10A to 10E are timing charts when the phase shift of the horizontal sync signal E5 by the jitter occurs as a phase delay on the contrary to FIGS. 8A to 8E. Namely, as shown in FIG. 10C, it is now assumed that the horizontal sync signal E5 is inverted from the H level to the L level with a delay by the phase shift due to the jitter for the inherent clock timing <2>. In this case, although the frequency division of the system clock E6 is performed until the clock timing <3>, the switching operation to the inverted system clock E7 is executed by the next clock timings <4> and <5> and the frequency dividing mode is switched to the frequency division of the inverted system clock E7 at the clock timing <6>. FIG. 11 shows states of signals in FIGS. 10A to 10D at the clock timings <1> to <6> in FIG. 10.

AS will be obviously understood from FIG. 11, with respect to the jitter which causes the phase delay at the clock timing <3> at which the horizontal sync signal E5 is changed from the H level to the L level, after a signal state H of the dot clock E8 for luminance at that time was maintained for a period of time of the next switching clock timings <4> and <5>, it is switched to a signal state L of the dot clock by the frequency division of the inverted system clock E7 at the clock timing <6>. In this case, the horizontal sync period is increased by the jitter due to the phase delay of the horizontal sync signal E5, so that the last dot No. in the horizontal scan period of the luminance data in FIG. 10E is increased by "1" and is set to 911. The luminance data of the first dot No. 1 in the next horizontal scan period is lost and the luminance data is processed from the dot No. 2.

The timing charts in FIGS. 8A to 8E and FIGS. 10A to 10E are shown with respect to the example of the switching to the inverted system clock E7 when the phase shift due to the jitter occurs in the horizontal sync signal E5 in the state of the frequency dividing operation in which the system clock E6 is selected. However, when the jitter of the horizontal sync signal E5 disappears as shown in FIG. 5 in the frequency dividing state by the selection of the inverted system clock E7, the state is returned to the original frequency dividing state by the selection of the system clock E6.

Although the above embodiment has been shown and described with respect to the example of using the NTSC signal as a television signal, the invention can be also applied to the PAL system used in Germany, England, or the like or the SECAM system used in, France, Russia, or the like. The NTSC system, PAL system, and SECAM system are the same with respect to a point that each of the three primary color signals of RGB is converted into a luminance signal and a chrominance signal, thereby forming a composite signal. However, the PAL system and SECAM system differ from the NTSC system with respect to a method whereby two color difference signals are transmitted by using one color subcarrier which is arranged in a frequency band of the luminance signal. Those systems are different with respect to a point that although the number of scanning lines in the NTSC system is equal to 525 and the number of fields per second is equal to 60, in case of the PAL system and SECAM system, the number of scanning lines is equal to 625 and the number of fields per second is equal to 50. Therefore, if a circuit construction adapted to the signal forms of the PAL system and SECAM system for the NTSC system is used with respect to the embodiment of FIG. 3, the present invention can be applied as it is. The invention can be also similarly applied with respect to the signal form of the extended definition television system (EDTV). Further, as for a construction of a circuit section other than the clock generating circuit 28 in the embodiment of the invention, so long as the same circuit function can be realized, a proper circuit construction can be used.

According to the invention as described above, in the processes such that after the television signal from the outside was subjected to the digital process, the resultant digital signal is again converted into the analog signal and generated, the clock whose phase was matched with the external horizontal sync signal is used with respect to the luminance conversion, and the clock which is not related to the phase of the external horizontal sync signal and which keeps a continuity is used with regard to the chroma conversion. Therefore, the luminance signal which is generated after completion of the image process is phase matched even if there is a jitter in the horizontal sync signal by an external input, so that an oscillation in the horizontal scan can be certainly prevented. At the same time, even if there is a jitter in the external horizontal sync signal, the chroma signal can keep the phase relation with the burst signal as a color reference subcarrier constant without being influenced by such a jitter. Therefore, even if the conversion such that image data by a processor or the like is added to the image data of the television signal from the outside and is again returned to the television signal is executed, the video signal that is matched with the external television signal can be properly formed. Since all of the image synthesizing processes of the television signal from the outside inputted as an analog signal are executed by the digital processes, circuits for such image synthesizing processes can be also easily formed as an LSI. The invention can largely contribute to a simplification of the information processing apparatus having the television display function and a reduction of the costs.

What is claimed is:

1. An information processing apparatus having a television display function, comprising:

an external video input circuit that separates a vertical sync signal and a horizontal sync signal from an inputted television signal, having a predetermined signal format, and that extracts a luminance signal and a chrominance signal from the television signal and that converts the luminance and chrominance signals into image data having a predetermined format;

an image processing circuit that executes an image process on the image data from said external video input circuit and outputs the processed image data;

an output converting circuit that converts the processed image data from said image processing circuit into an output luminance signal and an output chrominance signal, both having a television signal format, by using different dot clocks and that outputs the output luminance and output chrominance signals synchronously with said vertical and horizonal sync signals separated by said external video input circuit; and a clock generating circuit that individually generates the dot clock for the output luminance signal and the dot clock for the output chrominance signal by a frequency division of a system clock of a predetermined frequency and that synchronizes the dot clock for the output luminance signal by phase matching with the horizontal sync signal separated by said external video input circuit.

2. An apparatus according to claim 1, wherein:

the image data is RGB data;

said output converting circuit has a converting circuit for converting RGB data into luminance data and color difference data, a sync signal adding circuit for adding the vertical and horizontal sync signals, synchronized with the inputted television signal, to said luminance data, a reference phase adding circuit that modulates the color difference data after adding a color reference phase signal of said television signal to the color difference data, a first D/A converting circuit for converting the luminance data into an analog signal, and a second D/A converting circuit for converting the color difference data into an analog signal; and wherein said clock generating circuit has a clock oscillator for generating a system clock of a predetermined frequency, a selection frequency dividing circuit for receiving the system clock and its inverted system clock, for selecting said system clock and outputting its frequency dividing clock when said horizontal sync signal lies within a specific phase timing range having a predetermined width, for selecting said inverted system clock and outputting its frequency dividing clock when said horizontal sync signal is deviated out of said specific phase timing range due to a phase jitter and is shifted to an adjacent clock range of a predetermined width before and after said specific phase timing range, and for supplying said frequency dividing clock as a dot clock to said sync signal adding circuit and said first D/A converting circuit, and a frequency dividing circuit for frequency dividing the system clock of said clock oscillator as it is and for supplying the resultant frequency dividing clock as a dot clock to said reference phase adding circuit and said second D/A converting circuit.

3. An apparatus according to claim 2, wherein:

when said horizontal sync signal lies within a specific phase timing range of a ½ clock width, said selection frequency dividing circuit selects the system clock and generates its frequency dividing clock; and when said horizontal sync signal is deviated out of the specific phase timing range by a phase jitter and is shifted to an adjacent clock range of a ½ clock width before and after the specific phase timing range, said selection frequency dividing circuit selects the inverted system clock and generates a frequency dividing clock.

4. An apparatus according to claim 1, wherein said external video input circuit comprises:

a sync separating circuit for extracting the horizontal and vertical sync signals from the inputted television signal;

an RGB converting circuit for separating the luminance signal and the chrominance signals from the inputted television signal and subsequently outputting RGB signals; and an A/D converting circuit for digitally converting the RGB signals into RGB data having a predetermined format.

5. An apparatus according to claim 1, wherein:

when the inputted television signal is an NTSC signal;

said external video input circuit has:

a sync separating circuit extracting the vertical and horizontal sync signals from the NTSC signal;

an RGB converting circuit extracting a luminance signal (Y) and color difference signals (B−Y) and (R−Y) from the NTSC signal and subsequently outputting RGB signals; and an AND converting circuit digitally converting the RGB signals into RGB data having a predetermined format;

said output converting circuit has:

an RGB matrix circuit for converting the RGB data into luminance data (Y) and color difference data (B−Y) and (R−Y), a low pass filter for eliminating a high band component by a digital sampling of the color difference data (B–Y) and (R–Y), a level converter for adjusting levels of the luminance data (Y) and said color difference data (B–Y) and (R–Y) to match a standard level of the NTSC signal, a timing generator for generating timing signals for adding the vertical and horizontal sync signals synchronized with the NTSC signal and a color phase reference burst signal, a sync adding circuit for adding the vertical and horizontal sync signals to the luminance data (Y), a burst adding circuit for adding a burst signal to the color difference data (B–Y) and (R–Y), a modulator for performing a two-phase orthogonal modulation to the color difference data (B–Y) and (R–Y) and modulating into chroma data (C), a first D/A converting circuit for converting the luminance data into an analog luminance signal, and a second D/A converting circuit for converting the chroma data (C) into an analog chroma signal; and said clock generating circuit has:

a clock oscillator for generating a system clock of a frequency that is 8 times as high as a frequency fsc of a color reference subcarrier, a selection frequency dividing circuit receiving the system clock of said clock oscillator and an inverted clock signal, selecting said system clock and outputting a clock of 4 fsc frequency divided into ½ when said horizontal sync signal lies within a specific phase timing range having a predetermined width, for selecting the inverted system clock and outputting a clock of 4 fsc which was frequency divided into ½ when said horizontal sync signal is deviated out of said specific phase timing range due to a phase jitter and is shifted to an adjacent clock range of a predetermined width before and after said specific phase timing range, and supplying the frequency dividing clock as a dot clock to said sync signal adding circuit and said first D/A converting circuit, and a frequency dividing circuit for frequency dividing the system clock of said clock oscillator into a clock of 4 fsc of ½ and for supplying the frequency dividing clock as a dot clock to said reference phase adding circuit and said second D/A converting circuit.

6. An apparatus according to claim 5, wherein said modulator converts the color difference signals (B–Y) and (R–Y) into the two-phase orthogonal modulated chroma data (C) using said dot clock of the frequency of 4 fsc.

7. An apparatus according to claim 1, wherein the inputted television signal is one of an PAL signal, an SECAM signal, or a high quality television signal.

* * * * *

UNITED STATES PATENT AND TRADEMARK OFFICE
CERTIFICATE OF CORRECTION

PATENT NO. : 5,907,368
DATED     : May 25, 1999
INVENTOR(S): Satoshi NAKAMURA, et al.

It is certified that error appears in the above-identified patent and that said Letters Patent is hereby corrected as shown below:

Cover Page:  Assignee Information is missing.
    Should be    --Fujitsu Ltd. & Fujitsu General Ltd., both of Kawasaki, Japan--.

Col. 12, line 61, "AND" should be --A/D--.

Signed and Sealed this

Ninth Day of November, 1999

Attest:

Q. TODD DICKINSON

*Attesting Officer*    *Acting Commissioner of Patents and Trademarks*